(12) United States Patent
Wiseman (10) Patent No.: US 8,108,679 B2
(45) Date of Patent: Jan. 31, 2012

(54) FIREWALL SYSTEM

(75) Inventor: Simon Robert Wiseman, Malvern (GB)

(73) Assignee: Qinetiq Limited (GB)

( * ) Notice: Subject to any disclaimer, the term of this patent is extended or adjusted under 35 U.S.C. 154(b) by 1251 days.

(21) Appl. No.: 11/596,526

(22) PCT Filed: May 12, 2005

(86) PCT No.: PCT/GB2005/001844
§ 371 (c)(1),
(2), (4) Date: Nov. 14, 2006

(87) PCT Pub. No.: WO2005/114947
PCT Pub. Date: Dec. 1, 2005

(65) Prior Publication Data
US 2007/0245415 A1      Oct. 18, 2007

(30) Foreign Application Priority Data

| May 20, 2004 | (GB) | .................................... 0411203.3 |
| Jul. 16, 2004 | (GB) | .................................... 0415895.2 |

(51) Int. Cl.
*G06F 21/20* (2006.01)
*G06F 15/16* (2006.01)
*H04L 9/32* (2006.01)

(52) U.S. Cl. ............... 713/176; 726/11; 726/12; 726/14
(58) Field of Classification Search ......................... None
See application file for complete search history.

(56) References Cited

U.S. PATENT DOCUMENTS

| 6,032,259 A | 2/2000 | Nemoto |
| 6,105,072 A | 8/2000 | Fischer |
| 6,141,749 A | 10/2000 | Coss et al. |
| 6,167,428 A | 12/2000 | Ellis |
| 6,212,633 B1 | 4/2001 | Levy et al. |

(Continued)

FOREIGN PATENT DOCUMENTS

JP      2001358774      12/2001

(Continued)

OTHER PUBLICATIONS

Epstein, J., "Architecture and Concepts of the ARGUE Guard", Computer Security Applications Conference, Proceedings 15th Annual Phoenix, AZ, pp. 45-54 (1999).

(Continued)

*Primary Examiner* — Christopher Revak
(74) *Attorney, Agent, or Firm* — McDonnell Boehnen Hulbert & Berghoff LLP (57) ABSTRACT

A firewall system employs signature validation hardware communicating via low level communication protocols and with inner and outer host computers, which have network protocol stacks and for implementing complex communication protocols with remote source and destination computers. The source computer has data checker and signature functionalities, which respectively check data and generate digital signatures for data to be transmitted. The inner host computer receives transmitted data and converts it to a lower protocol level at which the hardware operates. The hardware uses digital circuitry for protocols and checking. It validates signatures in data at a software application level, but only requires protocols that are simple and low level. The firewall system communicates with the source and destination computers via high performance connection media. The hardware itself communicates with the host computers also via high performance connection media, and avoids involvement with complex communications protocols which make other firewalls vulnerable.

24 Claims, 8 Drawing Sheets

U.S. PATENT DOCUMENTS

| | | | |
|---|---|---|---|
| 6,701,432 | B1 | 3/2004 | Deng et al. |
| 7,150,040 | B2 * | 12/2006 | Brownell .................... 726/11 |
| 7,225,335 | B2 | 5/2007 | Sato |
| 7,246,230 | B2 * | 7/2007 | Stanko .................... 713/155 |
| 7,260,840 | B2 * | 8/2007 | Swander et al. ............. 726/13 |
| 7,685,425 | B1 * | 3/2010 | Wright et al. ............... 713/176 |
| 2002/0078377 | A1 | 6/2002 | Chang |
| 2002/0169954 | A1 | 11/2002 | Bandini et al. |
| 2003/0097431 | A1 | 5/2003 | Dill |
| 2003/0167410 | A1 | 9/2003 | Rigstad et al. |
| 2004/0083359 | A1 * | 4/2004 | Camus et al. ............... 713/156 |
| 2004/0123108 | A1 * | 6/2004 | Winkler et al. ............. 713/176 |
| 2005/0021972 | A1 * | 1/2005 | Levi et al. .................. 713/176 |
| 2005/0251682 | A1 * | 11/2005 | Collins et al. ............... 713/176 |
| 2006/0005026 | A1 * | 1/2006 | Song et al. .................. 713/173 |
| 2006/0053486 | A1 * | 3/2006 | Wesinger et al. ............ 726/15 |
| 2006/0075478 | A1 * | 4/2006 | Hyndman et al. ........... 726/11 |
| 2007/0174467 | A1 * | 7/2007 | Ballou et al. ................ 709/227 |
| 2010/0180331 | A1 * | 7/2010 | Murakami et al. ........... 726/11 |

FOREIGN PATENT DOCUMENTS

WO    WO 2004/008271      1/2004

OTHER PUBLICATIONS

Vick, "An Overview of the AMC WWMCCS Cat Guard", 8th Annual Computer Security Application Conference, San Antonio, Texas, USA, Nov. 1992.

Fiorino et al., "Lessons Learned During the Life Cycle of an MLS Guard Deployed at Multiple Sites", Procs. 11th Annual Computer Security Applications Conference, New Orleans LA, Dec. 1995.

Cheng, Master's Dissertation for the University of Saskatchewan entitled "Silicon Firewall Prototype", dated Dec. 8, 2003, URN etd-121252003-142455.

Cho et al., "Specialized Hardware for Deep Network Packet Filtering", International Conference on Field Programmable Logic and Applications (FPL), Montpellier, France, Sept. 2002.

* cited by examiner

FIREWALL SYSTEM

BACKGROUND OF THE INVENTION (1) Field of the Invention

This invention relates to a firewall system for monitoring communications between computer systems and networks.

(2) Description of the Art

It is known to use a firewall to protect a critical network from other networks connected to it. Critical computer networks handling sensitive or important information may be required to connect with other networks in order to exchange information. In making such a connection, the critical network's information becomes vulnerable, both to attack from users of the connected network and from errors in its own operation. A firewall controls which services provided by a critical network are available to computers on a network connected to the critical network, and vice versa. If the firewall operates correctly, it can provide a defence against attacks and errors by restricting the types of interaction that can take place between networks.

However, a firewall is a computer system running software for complex communications protocol handling and data checking, and in consequence is itself vulnerable to errors/failure and to attack. Several techniques are known for improving the robustness of firewalls by reducing their complexity, but these either limit the complexity of checks that can be performed or impair performance.

Firewalls operate with the aid of communications protocols which are built up in layers or levels, with services offered by one (lower) layer being used by a subsequent layer above it to implement a richer protocol. Layers arranged in succession upwardly may be referred to as the electrical level, link level, network level, transport level and session level. The network level provides for computers on the same network to communicate with one another, and the transport level provides for computers on different networks to communicate with one another. The network level is a relatively low level at which a firewall might operate. A firewall intercepts a lower level communication between two networks and performs some checks on that communication. The number of layers that are intercepted can be varied, providing a trade off between firewall strength and performance.

Firewalls that intercept at only a relatively low protocol layer are faster because minimal protocol handling is required. However they have limited effectiveness because attacks or errors occurring in protocol layers above the intercepted layer cannot be detected by them. In contrast, firewalls that intercept all the layers of protocol are slower because they must perform more protocol handling, but are stronger because they can check all information in the communications.

"Building Internet Firewalls", D. Brent Chapman & Elizabeth D. Zwicky, O'Reilly 1995, ISBN 1-56592-124-0 is a text book which provides a standard, reference work for firewall construction. Cisco Systems of San Jose, Calif. offer a variety of firewall products. This indicates that it is known to construct a firewall having checks implemented by a software application running on a general purpose computer having a network protocol stack. The security weakness with such application level firewalls is that flaws, or configuration mistakes, in the network protocol stack or the checks may lead to the checks being bypassed.

US Pat. Appln. No. 2003/0167410 to Rigstad discloses an implementation of a Virtual Private Network using hardware and encryption. US Pat. Appln. No. 2003/0097431 to Dill discloses a computer working as a basic port filtering firewall platform. US Pat. Appln. No. 2003/0078377 to Chang discloses firewalls for CORBA services, managed by a central but distributed database but not an Internet firewall. Here "CORBA" is Common Object Request Broker Architecture, a protocol for communication between parts of a distributed application.

U.S. Pat. No. 6,141,749 to Coss discloses improving stateful inspection firewalls operating at lowest levels of protocol. U.S. Pat. No. 6,167,428 to Ellis discloses using networks of computers attached to the Internet to form a large parallel processor. It mentions a respective firewall processor in each computer controlling access to the computer's main processor, but does not disclose the nature of the firewalls themselves. U.S. Pat. No. 6,212,633 to Levy relates to adding security to Apple Computer's FireWire™ (IEEE 1394 communication media used for high speed peripherals such as digital video cameras). It discloses standard signature and encryption algorithms/techniques to make communication secure.

U.S. Pat. No. 6,701,432 to Deng discloses a hardware packet filtering firewall for low level packet communication. US Pat. Appln. No. 2002/0078377 to Cohen relates to stopping resource flooding attacks.

An alternative form of firewall is known which operates by signature checking. Here, checking of data in a message is carried out not by a firewall, but by a software application running on a computer network which is the source of the data. This approach is described by J Epstein in "Architecture and Concepts of the ARGuE Guard", 15$^{th}$ Annual Computer Security Applications Conference, Phoenix, Ariz., USA, December 1999. Before releasing data, a source network carries out complex application-specific checks, such as gaining a user's approval for a message to be released. The source network then applies an unforgeable digital signature to the message to indicate that the checks have been passed, and sends it to the firewall. To establish whether or not the message can be released by the firewall for transmission to a destination network, the firewall then has only to validate the digital signature instead of the whole message.

The advantage of a signature checking firewall is that checking is simplified and so less prone to flaws. However, the network protocol stack still remains as a weak point, because problems with it may lead to signatures not being checked.

U.S. Pat. No. 6,032,259 to Nemoto discloses a firewall avoiding failures in the network protocol stack which might otherwise result in checks being bypassed. The firewall intercepts communication at the highest protocol stack level but forwards it using a simple dedicated communication mechanism rather than via the network protocol stack. In this way errors in the complex protocol stack software do not lead directly to checks being bypassed. This approach relies on the simplicity achievable with a dedicated communication mechanism, but this can only provide connections to single software applications on single computers. Also, the simplicity can only be achieved by using relatively slow communications media, e.g. old media like serial data links which can be driven by relatively simple software. This is because modern operating systems invariably drive new high performance communications media such as USB, Firewire and Ethernet using complex high level protocols, in order to make best use of resources. In these operating systems, media drive software is structured into protocol stacks for ease of design. Moreover, U.S. Pat. No. 6,032,259 does not address the possibility that an attacker might use a flaw in the complex protocol stack to gain control of the firewall and then drive the simple communication mechanism directly. Hence this approach is limited in terms of applicability, performance and security.

It is also known to use specially constructed operating systems to provide a more general solution to the problem of providing a firewall. "An Overview of the AMC WWMCCS CAT Guard", R A Vick, Proc. 8th Annual Computer Security Applications Conference, San Antonio, Tex., USA, November 1992, discloses using features of a Wang operating system XTS-200 to provide two separate network stacks each driving a separate network interface. This approach ensures that flaws in a single network stack cannot lead to the checks being bypassed, even if they are exploited by an attacker. A related disclosure appears in "Lessons Learned During the Life Cycle of an MLS Guard Deployed at Multiple Sites", Thomas Forino et al, Procs. 11th Annual Computer Security Applications Conference, New Orleans La., December 1995.

A potential solution to improve performance is to implement the firewall's function in hardware instead of software. Possible techniques are described in a master's dissertation for the University of Saskatchewan entitled "Silicon Firewall Prototype", Cheng, Jin dated Dec. 8, 2003, URN etd-12152003-142455, and a paper "Specialized Hardware for Deep Network Packet Filtering", Young H. Cho, Shiva Navab, William H. Mangione-Smith, International Conference on Field Programmable Logic and Applications (FPL), Montpellier, France, September 2002.

SUMMARY OF THE INVENTION

It is an object of the invention to provide an alternative form of firewall system.

The present invention provides a firewall system having signature validation hardware arranged to receive data for validation and indicate whether or not the data incorporates a valid signature, the firewall system being arranged to use complex communication protocols to communicate with remote networks and relatively lower level communication protocols to communicate with the signature validation hardware, and the signature validation hardware being arranged to operate at software application level to ascertain data signature validity Because the invention combines signature validation hardware and low level communication protocols, it provides the advantage that it avoids the need for the hardware to be exposed to complex communications protocols that makes other firewalls vulnerable to attack. Unlike firewalls that use simple communications media in an attempt to limit the firewall's exposure to attack, the firewall of the invention may (optionally but preferably) make use of high performance media links, and can then check all data in a message. The invention therefore provides a combination of high security and high performance.

The firewall system of the invention may be arranged to communicate via high performance media links. The signature validation hardware may have digital circuitry to implement protocol handling and to ascertain signature validity. It may incorporate means for applying a hash function to data to create a hash number and means for encrypting the hash number to generate a signature unique to such data for comparison with and in order to ascertain validity of the signature incorporated in the data. The means for applying a hash function may be arranged to accumulate a hash number by processing data sequentially in sections. It may incorporate a store in which data are stored sequentially for access in applying the hash function. The store may be arranged to output data in response to validity of the signature incorporated in the data being ascertained.

The signature validation hardware may be arranged to communicate with a first computer when receiving data for checking and with a second computer when providing for checked data to be transmitted onwards, the first and second computers being arranged for communication with respective remote computer networks. A remote computer network may be responsible for applying complex checks to such data and applying a digital signature thereto.

The firewall system may incorporate an inner host computer arranged to receive data for validation by the signature validation hardware and an outer host computer arranged to transmit validated data, the inner and outer host computers being arranged to implement:
  a) complex communications protocols for communications with remote computer networks, and
  b) lower level communications protocols for communications with the signature validation hardware.

The firewall system is preferably arranged to communicate via high performance connection media. The signature validation hardware may incorporate field programmable gate array circuitry. It may alternatively incorporate logic units controlled by firmware, such as Harvard Architecture microcontroller firmware.

The firewall system may be arranged for data transfer in series with a second like firewall system providing protection against system failure. It may be arranged for data transfer in parallel with and in the opposite direction to a second like firewall system providing for two-way communication.

In an alternative aspect, the present invention provides a method of providing firewall protection comprising the steps of:—
  a) receiving data for validation from a source network using complex communication protocols;
  b) converting the data to a form based on relatively lower level communication protocols;
  c) communicating the converted data to signature validation hardware arranged to indicate whether or not such data incorporates a valid signature, the signature validation hardware being arranged to operate at software application level to ascertain data signature validity; and
  d) communicating data associated with a valid signature to a destination network.

The method of the invention may include the step of communicating with the signature validation hardware and the source and destination computer systems via high performance media links. The signature validation hardware may have digital circuitry to implement protocol handling and to ascertain signature validity.

The method may include the steps of:—
  a) using the signature validation hardware to apply a hash function to data to create a hash number; and
  b) encrypting the hash number to generate a signature unique to such data for comparison with and in order to ascertain validity of the signature incorporated in the data.

The step of applying a hash function may incorporate storing data in a store sequentially for access in applying the hash function. It may also include accumulating a hash number by processing data sequentially in sections.

DESCRIPTION OF THE FIGURES

In order that the invention might be more fully understood, embodiments thereof will now be described, by way of example only, with reference to the accompanying drawings, in which.

DETAILED DESCRIPTION OF THE INVENTION

Communications between computer systems are implemented using standard communications protocols which are complex. These protocols are designed to provide reliability across unreliable physical communications media and to share physical communication resources in a reasonable way between many software applications. Protocol complexity leads to communications which are likely to possess flaws, and the flaws may be exploitable to endanger computer system security.

Figure 1:
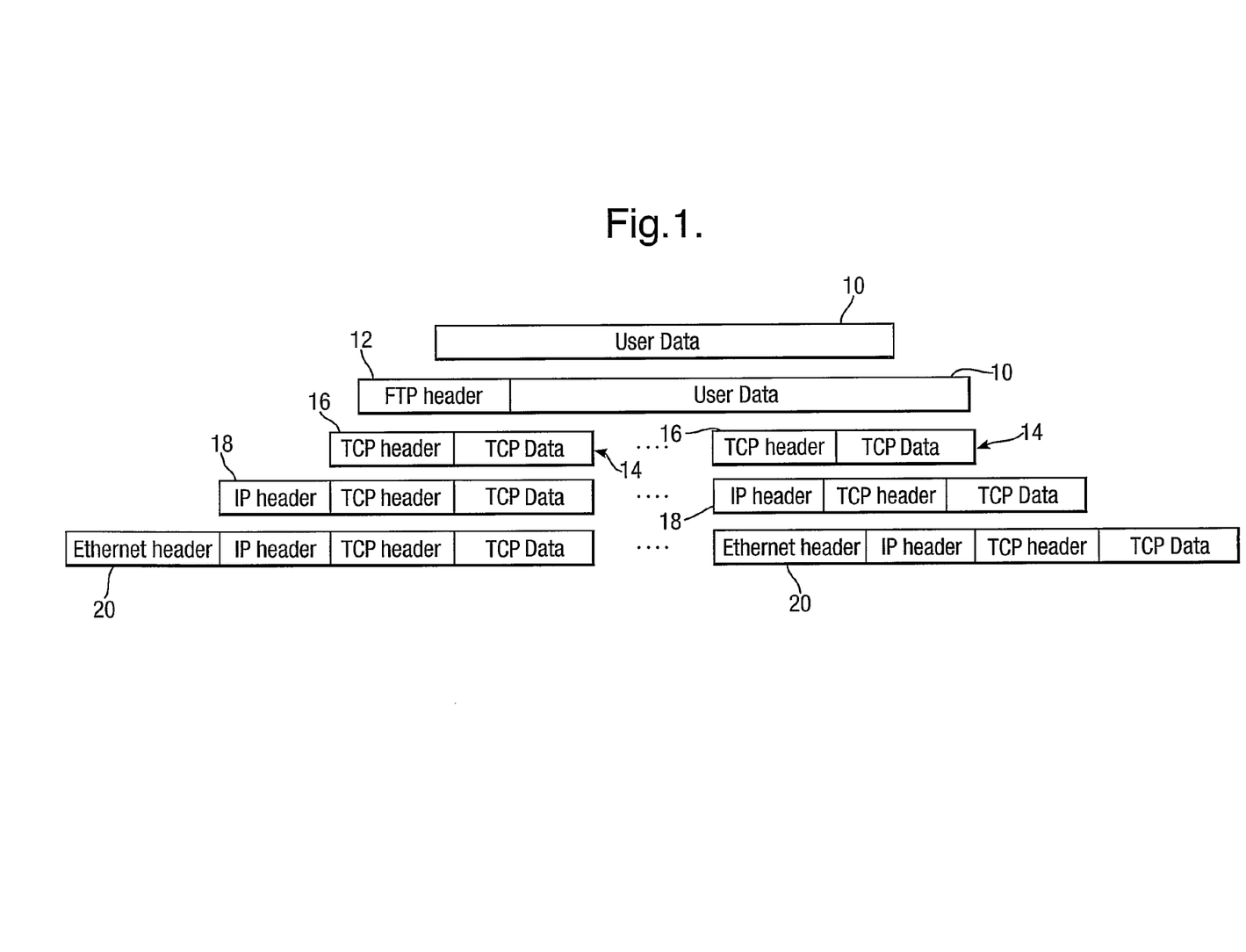
FIG. 1 illustrates the complexity of standard communications protocols.

Referring to FIG. 1; user data 10 is carried by an application protocol, in this example the File Transfer Protocol (FTP). This protocol wraps the user data 10 with additional header information 12. It uses a standard protocol, the Transmission Control Protocol (TCP), to transmit control commands and the user data across and between networks. TCP imposes a limit on the size of the data that can be transmitted in one piece as a frame of TCP data 14 headed by a TCP header 16, so many TCP frames are needed to carry a large FTP payload. Each TCP frame is wrapped in an Internet Protocol (IP) frame with header 18 to carry the data across a single network. TCP frames are physically transmitted across network segments using a protocol such as Ethernet, which requires the data to be wrapped by a further header 20.

Not only is the layering of protocols complex, as illustrated in FIG. 1, it is standard practice for the protocols themselves to be complex. A protocol is a prearranged sequence of exchanges of commands and data, designed to keep both ends of a communication in step even if failures prevent some data in the communication being delivered.

Figure 2:
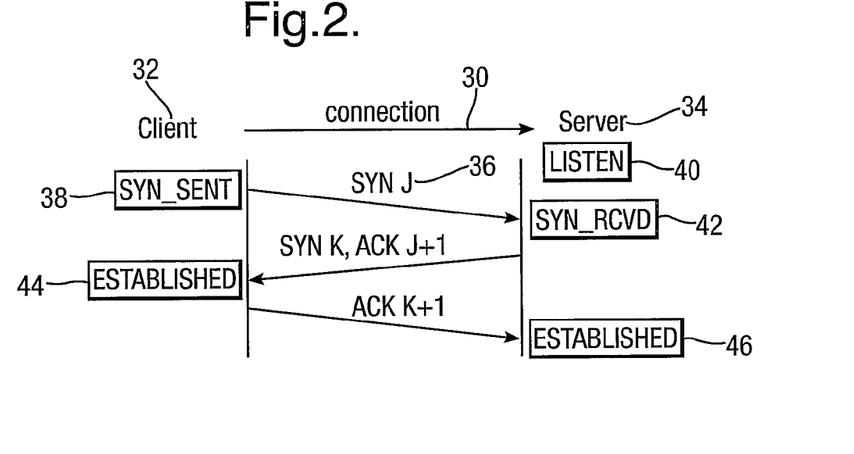
FIG. 2 illustrates the format of application level data.

Referring now also to FIG. 2, an example of a complex handshaking protocol interaction is shown schematically. In order to establish a connection 30 between a client computer 32 and a server 34, the client 32 sends a command data package SYN J (J indicating a package number) 36. This leaves the client 32 in a command sent state 38. The server 34 is initially in a listening state 40, and receipt of the SYN J command converts it to a received state 42. It signifies receipt by returning to the client 32 a command data package SYN K with an acknowledgement ACK J+1, and this switches the client 32 into a connection established mode 44. The client 32 signifies connection established by sending an acknowledgement ACK K+1, which when received switches the server 34 into a connection established mode 46 also. The numbers J and K are the initial packet sequence numbers which are chosen at random by the client and server respectively. Each subsequent packet sent is marked with a sequence number one higher than that used previously, subject to modulo the maximum sequence number value that can be stored in a packet. The use of sequence numbers allows the recipient to detect when data is lost or received out of order. The use of random values for the initial sequence number guards against errors and makes it more difficult for an attacker to take over an existing connection. The complexities of TCP/IP are more fully described in a text book "TCP/IP Illustrated, Volume 1" by W. Richard Stevens, published by Addison-Wesley, ISBN 0-201-63346-9.

Figure 3:
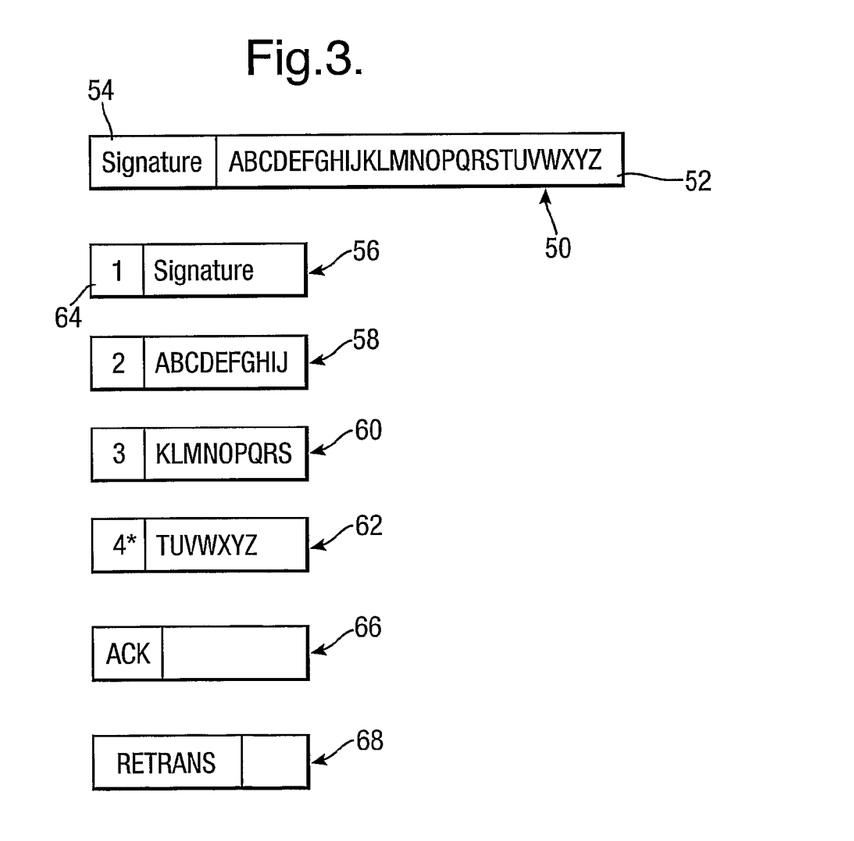
FIG. 3 illustrates the division of a communication into a series of frames.

The invention uses simple protocols to transfer application data from one device to another: it does not employ the complex protocol layers described with reference to FIG. 1. Referring now to FIG. 3, a communication 50 to be sent consists of application data 52 indicated by A to Z and a digital signature 54. If fast networking hardware such as Ethernet is used, the communication 50 will normally be too large to transmit in a single transmission. The communication 50 is therefore be divided into a series of frames 56, 58, 60 and 62 that are each small enough to be sent as a single transmission. Arrangements are then needed to enable the frames to be reassembled into the original application data by the receiver.

As the data is transmitted in frames, there is a possibility that one frame will be lost. In order to detect this, each frame carries a sequence number, e.g. sequence number 1 at 64. If a frame is received bearing a number that is out of sequence compared to frames received previously, the data received is discarded as a piece is missing. Frame numbering also allows the frames to be reassembled into the original application data. In order to detect that some application data has been received in full, the last frame 62 is marked as being the last frame as indicated in this example by *.

Once frames collectively providing some application data have all been received in order from a transmitter, the data can be handled by a software application running on a recipient computer. An acknowledgement of receipt may be sent by the recipient back to the transmitter in the form of a frame 66 with prearranged content. The transmitter may wait for the acknowledgement 66 before proceeding to send the next piece of application data.

If the recipient detects that one frame of some application data is missing, it may send a request for retransmission, in the form of a frame 68 with prearranged content, back to the transmitter. The transmitter may monitor incoming communications for retransmission requests, and, if one such is received, respond by re-sending the application data in full.

Figure 4:
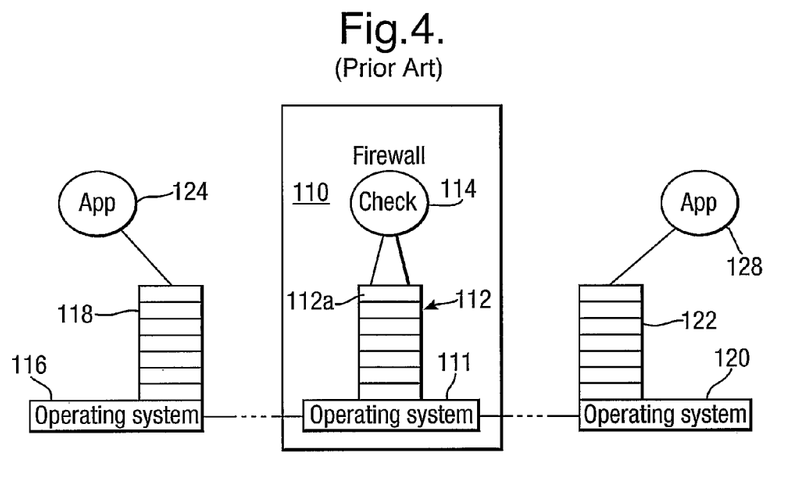
FIG. 4 is a schematic drawing of a prior art firewall employing application level data checking with communication via a two-way network protocol stack.

Referring to FIG. 4, a prior art firewall 110 is constructed using software and a general purpose computer (not shown) with two network interface cards (not shown). The computer has an operating system 111 and a network protocol stack 112 having successive protocol layers up to a highest protocol level 112a. It runs checking software 114, which it uses to check and control communication between two other computers represented by operating system/network stack combinations 116/118 and 120/122 running software applications (e.g. e-mail functionality) 124 and 128 respectively. In practice the checking software 114 would consist of checker software sandwiched between two items of proxy software, each of which simulates a receiving computer to a remote message sending computer and a message sending computer to a remote receiving computer. This simulation is by means of protocols the proxy software implements in communications with remote computers.

The firewall 110 is referred to as an application level firewall because it functions at the same protocol level as the software applications 124 and 128. In order that a communication might be subjected to checks by the checking software 114, it must pass through all the layers of the network protocol stack 112 to the highest protocol level 112a and beyond. Flaws or configuration mistakes in the network protocol stack 112 or the checking software 114 may lead to the checks being bypassed giving security weakness.

Figure 5:
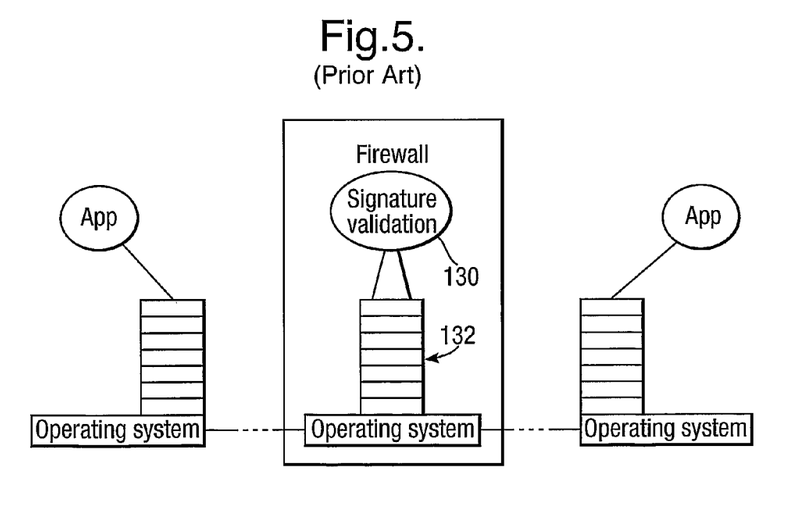
FIG. 5 is a schematic drawing of a prior art firewall employing signature validation with communication via a two-way network protocol stack.

FIG. 5 illustrates an alternative form of prior art application level firewall which operates by signature checking. This is very similar to FIG. 4, and will not be described in detail. The only difference compared to FIG. 4 is that the checking software 114 for checking and controlling communication is replaced by signature validation software 130. The signature validation software 130 carries out a check of validating a digital signature in each communication, which is a simpler check compared to that carried out by the checking software 114. Communications with appropriate signatures are allowed to pass, others are not. A digital signature is applied to a communication by the computer system which generated the communication. This approach is simpler and less prone to flaws: however, the network protocol stack 132 of the firewall remains a weak point, because as before problems with it can result in signature checking being bypassed.

Figure 6:
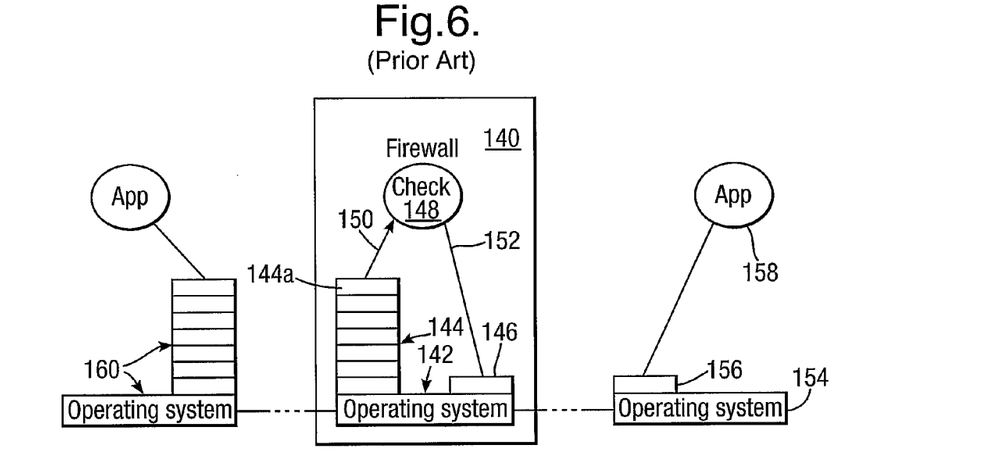
FIG. 6 is a schematic drawing of a prior art firewall employing application level data checking with input communication via a network protocol stack and output communication using a low level protocol.

FIG. 6 is a schematic illustration of an arrangement of a firewall 140 of the kind disclosed in U.S. Pat. No. 6,032,259. This avoids failures in a network protocol stack which would otherwise result in checks being bypassed. The firewall 140 is a computer indicated by an operating system 142, a network protocol stack 144, a simple low-level dedicated communication mechanism 146 and checking software 148. As indicated by connections 150 and 152, the checking software 148 receives communications for checking from the top of the network protocol stack 144 and supplies checked and approved communications to the communication mechanism 146 for onward transmission to a receiving computer system indicated by an operating system 154, communication mechanism 156 and application software 158. The firewall 140 consequently intercepts communications from a sending computer system 160 at the highest protocol level 144a of the network protocol stack 144, and forwards it using the low-level communication mechanism 146 instead of a network stack. Because the network protocol stack 144 is not connected to both input and output, errors in its complex software do not lead directly to checks in the checking software 148 being bypassed. This approach can only provide connections to single software applications on single computers. It is relatively slow, since it cannot use high performance media which require complex software. Moreover, a flaw in the complex network protocol stack 144 may allow an attacker to control the firewall 140 and drive the communication mechanism 146 directly.

Figure 7:
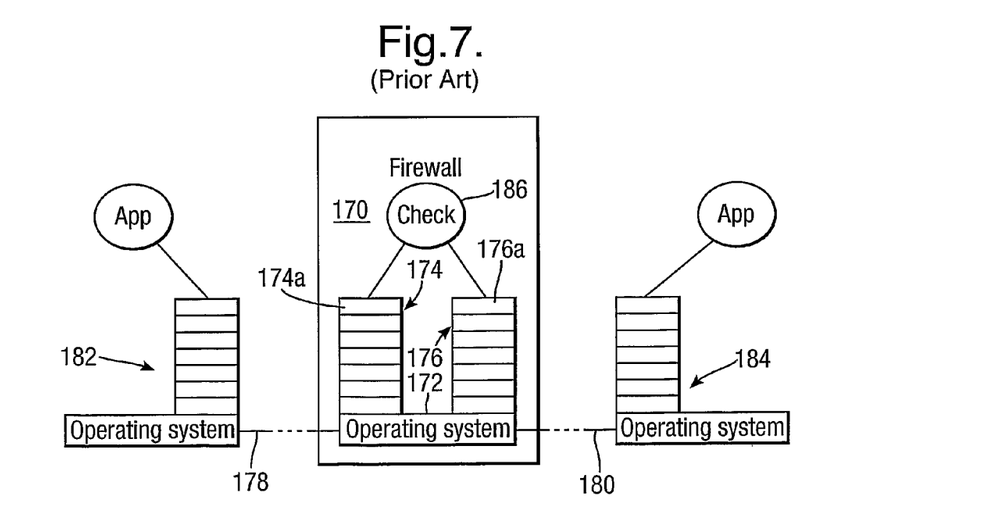
FIG. 7 is a schematic drawing of a prior art firewall employing application level data checking with communication via two separate network stacks each driving a separate network interface.

FIG. 7 schematically shows an application level firewall 170 of the kind disclosed in the R A Vick reference previously mentioned. A Wang XTS-200 operating system 172 is used to provide the firewall 170 with two separate network protocol stacks 174 and 176, each of which drives a respective network interface indicated by connections 178 and 180 to remote computer systems 182 and 184. Checking software 186 intercepts communications from a sending computer system 182 or 184 at highest protocol levels 174a and 176a of the network protocol stacks 174 and 176, and applies checks. Flaws in a single network protocol stack 174a or 176a cannot lead to the checks being bypassed, even if they are exploited by an attacker.

Figure 8:
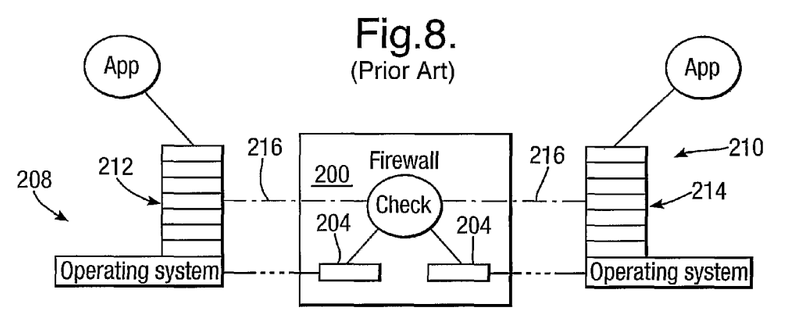
FIG. 8 is a schematic drawing of a prior art hardware implementation of a firewall.

Referring now to FIG. 8, a prior art hardware implementation of a firewall 200 is shown schematically. It employs checking hardware 202 linked to two low level protocols 204 and 206 and thence to respective remote computers 208 and 210 with respective network protocol stacks 212 and 214. The hardware 202 uses logic gates to reproduce the protocol handling and checking functionality of a conventional software-implemented firewall. However, the complexity of standard Internet protocols is such that the hardware 202 is only practical for low level (or lower layer) protocols such as TCP/IP, rather than software application level protocols such as SMTP. This is indicated schematically by dashed lines 216 (which are not physical connections) linking the checking hardware 202 to a relatively low level (e.g. network level) in each of the network protocol stacks 212 and 214. Consequently, hardware firewalls of this type can, in practice, only apply checks to relatively low level protocols, and are easily defeated by mistakes in higher level protocols, especially if an attacker is in a position to control them.

Figure 9:
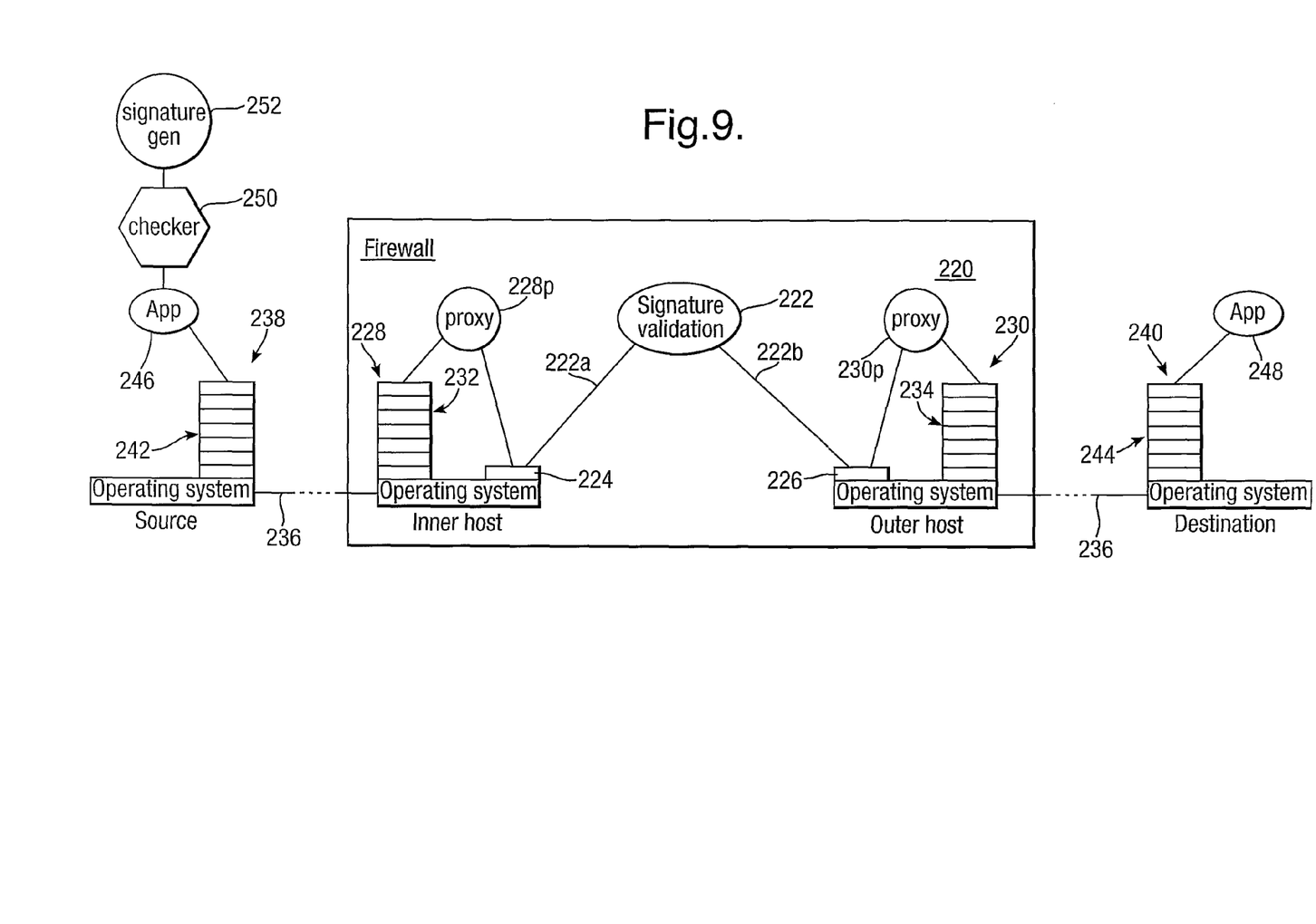
FIG. 9 is a schematic diagram of a firewall of the invention.

FIG. 9 schematically shows a firewall 220 of the invention. It employs signature validation hardware 222 with links 222a and 222b to two low level communication protocols 224 and 226 provided by inner and outer host computers 228 and 230 respectively. The links 222a and 222b are high performance communications media. The inner and outer host computers 228 and 230 have network protocol stacks 232 and 234 and run proxy software 228p and 230p for down-converting and upconverting communication protocols respectively. They are linked by high performance communications media 236 to source and destination computer networks 238 and 240, each having a plurality of computers but shown as a respective single computer in each case: computers or computer systems in the networks 238 and 240 have network protocol stacks 242 and 244 and run software applications (e.g. e-mail functionality) 246 and 248 respectively.

The source computer network 238 also has software checker and signature generation functionalities 250 and 252 used by the application 246, which cannot access the signature generation functionality 252 directly, only via the checker functionality 250. Before the source computer network 238 sends data in a message to the destination computer network 240, it uses the checker functionality 250 to check the data. If the data successfully passes the tests implemented by the checker functionality 250, the checker functionality 250 calls up the signature generation functionality 252 to obtain a digital signature, which itself is then applied to the data. The digital signature is unique to the data, and is derived using known encryption techniques. The application 246 is not given direct access to the signature generation functionality 252 to avoid data being signed without any check. Using complex protocols, the message incorporating the digital signature is then sent via the high performance medium 236 to the firewall 220, whose stack 232 assembles it and passes it to the proxy 228p. The proxy 228p passes the message to the low level communication protocol 224 which passes it to the signature validation hardware 222 via the high performance low level communications link 222a using a simple protocol.

The signature validation hardware 222 uses digital circuitry to implement protocol handling and data checking. It checks that the signature within the message is appropriate for the message. If the signature is appropriate for the message, the signature validation hardware 222 passes the message to the low level protocol 226 using the high performance low level communications link 222b. The low level protocol 226 passes the message to proxy 230*p* which passes it to the stack 234 for onward transmission to the destination computer network 240. If the signature is not appropriate for the message, the message is rejected and expunged from the firewall 220.

The firewall 220 as a whole operates at complex protocol level as regards receiving data for checking and passing on data which has been checked and proved acceptable: however, the signature validation hardware 222 communicates with the inner and outer hosts 228 and 230 using a lower level protocol, and therefore cannot be affected by problems associated with the complexities of handling higher protocol levels. Despite this, the signature validation hardware 222 operates effectively at application level because it deals with an entire message as produced by the software application 246 which created it.

Because the firewall 220 of the invention uses simple protocols and signature validation, a relatively simple check, it is possible to implement signature validation using hardware. It may for example incorporate field programmable gate array integrated circuits or logic units controlled using firmware in a Harvard Architecture microcontroller. In this connection, unlike a von Neumann computer architecture, a Harvard Architecture has separate memories for data and instructions. This permits fetching or storing of instructions in instruction memory and operands in data memory all in a single machine cycle. It also has the advantage that the function of the firmware cannot be modified to incorporate instructions taken from the data memory, even if an attacker were to discover flaws in the operation of the firmware.

To allow communications protocols implemented by the firewall 220 to be kept simple, and thus less prone to error, the firewall 220 communicates with a single host computer 228 or 230 in receiving or transmitting data respectively. As indicated by network protocol stacks 232 and 234, each host computer 228 or 230 is responsible for implementing complex communications protocols for receiving data from or passing data to a remote computer network 238 or 240. However, the host computers 228 and 230 communicate with the signature validation hardware 222 using only a simple lower level protocol 224 or 226. The signature validation hardware 222 itself need only isolate the digital signature in data it receives and check the signature's validity. If the signature is valid the firewall 220 reasonably assumes complex checks were previously applied by the remote source computer network 238 and the data can be passed through to the destination computer network 240.

Unlike prior art firewalls that use digital signatures, the checking component of the firewall 220 is a combination of signature validation hardware 222 and low level communication protocols 224 and 226: this combination avoids the need for complex communications protocol software that makes other firewalls vulnerable to attack. For example, unlike the prior art described with reference to FIG. 4, flaws or configuration mistakes in the network protocol stack 232 cannot lead to the signature validation hardware 222 being bypassed.

Unlike firewalls that use simple communications media in an attempt to limit the firewall's exposure to attack, the signature validation hardware 222 has high performance media links 222*a* and 222*b* for communicating with the inner and outer host computers 228 and 230, and can check all data in a message. The inner and outer host computers 228 and 230 may communicate with as many other computers on a remote network as may be required. The invention therefore provides a combination of high security and high performance.

Figure 10:
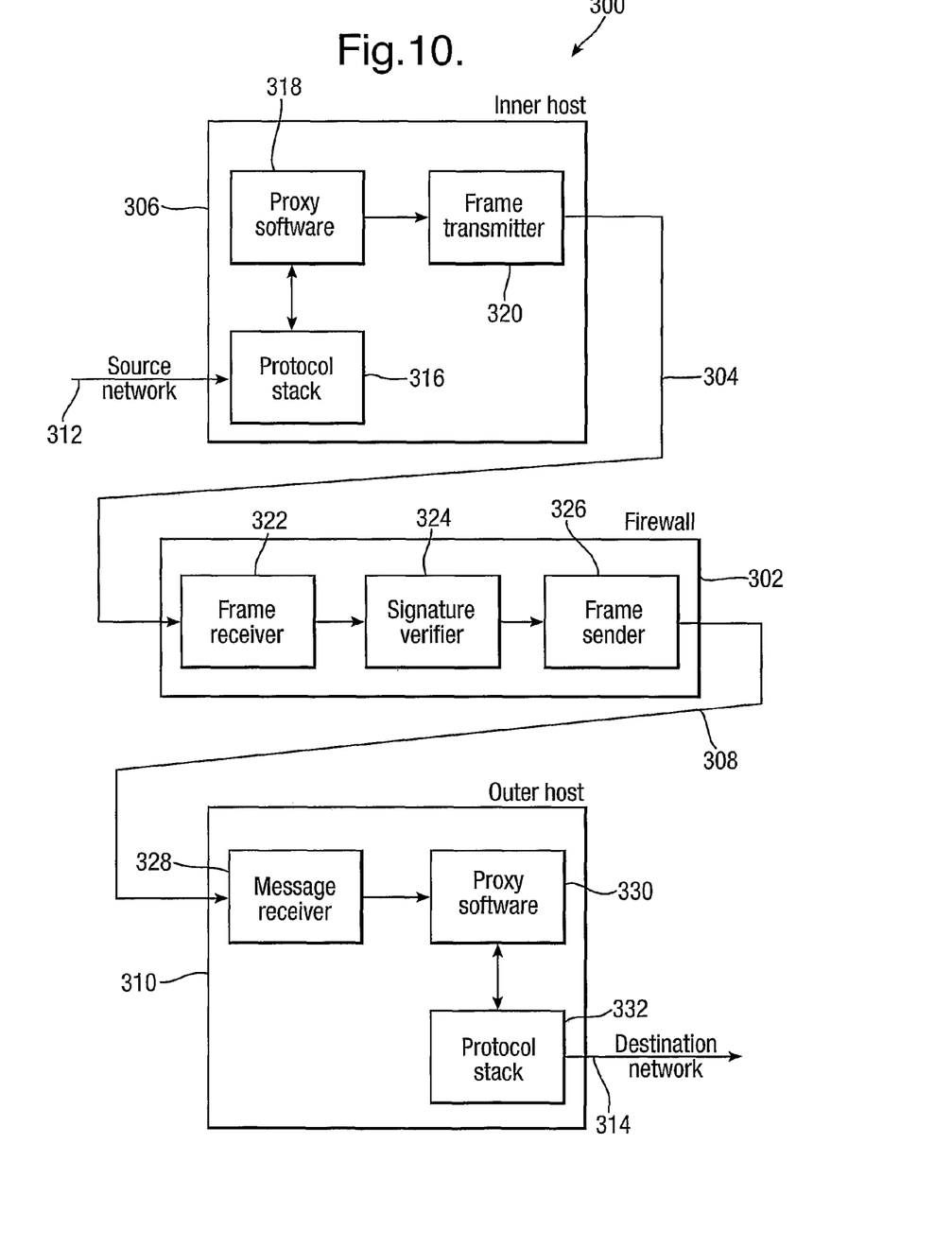
FIG. 10 is a block diagram of a firewall of the invention shown in more detail compared to FIG. 9.

Referring now to FIG. 10, a firewall system 300 of the invention is shown in more detail. The firewall itself is shown at 302 connected at 304 to an inner host computer 306 and at 308 to an outer host computer 310. The inner host computer 306 is connected at 312 to a source computer network (not shown), and the outer host computer 310 is connected at 314 to a destination computer network (not shown). The inner host computer 306, the firewall 302 and the outer host computer 310 provide a one-way connection from the source computer network to the destination computer network. Bi-directional communication between the source and destination networks is achieved using two separate instances of the firewall system 300 in parallel.

Communication consists of messages passing from the source network to the destination network connected to the firewall system 300 at 312 and 314 respectively. Each message is received in the inner host computer 306 by a protocol stack 316, which as described earlier has a number of layers and is implemented by an operating system (not shown). The protocol stack 316 receives a message in conventional complex form, converts it to application level data which it passes to a proxy 318. The proxy 318 receives the application level data from the top of the protocol stack 316 by means of standard software interfaces, and converts it into a sequence of data frames of for example $10^3$ bytes length. Each data frame has a header labelling it with a serial number in the sequence of frames in the message together with its size. The first frame may also contain the number of frames in the message, or alternatively the last frame in the message may include code indicating that it is the last frame. One of the frames in the message, conveniently in this example the first frame, contains a digital signature, which, if it remains unadulterated, was applied to the message by the source network. As will be described later in more detail in connection with FIG. 11, the digital signature is obtained using a cryptographic process operating upon all data in the message. It is very sensitive to change in the contents of the message.

The proxy 318 passes the data frames to a frame transmitter 320, which implements a lowest protocol level of a network protocol stack (effectively a low level network driver). The frame transmitter 320 processes the data frames so that they are suitable for transmission and outputs them to the firewall 302 via the connection 304.

Data frames from the frame transmitter 320 in the inner host computer 306 pass to a frame receiver 322 in the firewall 302. The frame receiver 322 is implemented in logic circuitry: its function is simply to receive data from a data link and to acknowledge receipt every few data frames. The frame receiver 322 also corresponds to a lowest protocol level of a network protocol stack. It removes the signature frame from the data frames and reads it into a signature store (not shown) in a signature verifier 324. It takes all other data frames in the message and puts them in their numbered sequence into a buffer store (not shown) also in the signature verifier 324. The signature in the signature store and the data in the buffer store are used by the signature verifier 324 to validate or invalidate the digital signature. Using a cryptographic process, the signature verifier 324 calculates a valid digital signature from the message contents of the buffer store. If the digital signature in the signature store does not match that calculated by the signature verifier 324, it is invalidated and the message is rejected, i.e. not transmitted to the outer host 310. Failure to obtain a signature match means at least one of the signature and the message has been adulterated in some way since the signature was applied to the message. If the digital signature in the message matches that calculated by the signature verifier 324, it is validated: the buffer store contents are then reformatted into data frames by a low level protocol frame sender 326 and transmitted to the outer host 310 via the connection 308.

In the outer host 310, data frames from the firewall 302 are received by a low level protocol message receiver 328 equivalent to the frame receiver 322. The data frames are reassembled into a message format by proxy software 330, which also simulates a source network by providing protocol communications to the destination network. It then passes to a protocol stack 332 which formats it for transfer via the connection 314 to a mail server (not shown) and transmission to the destination network.

Figure 11:
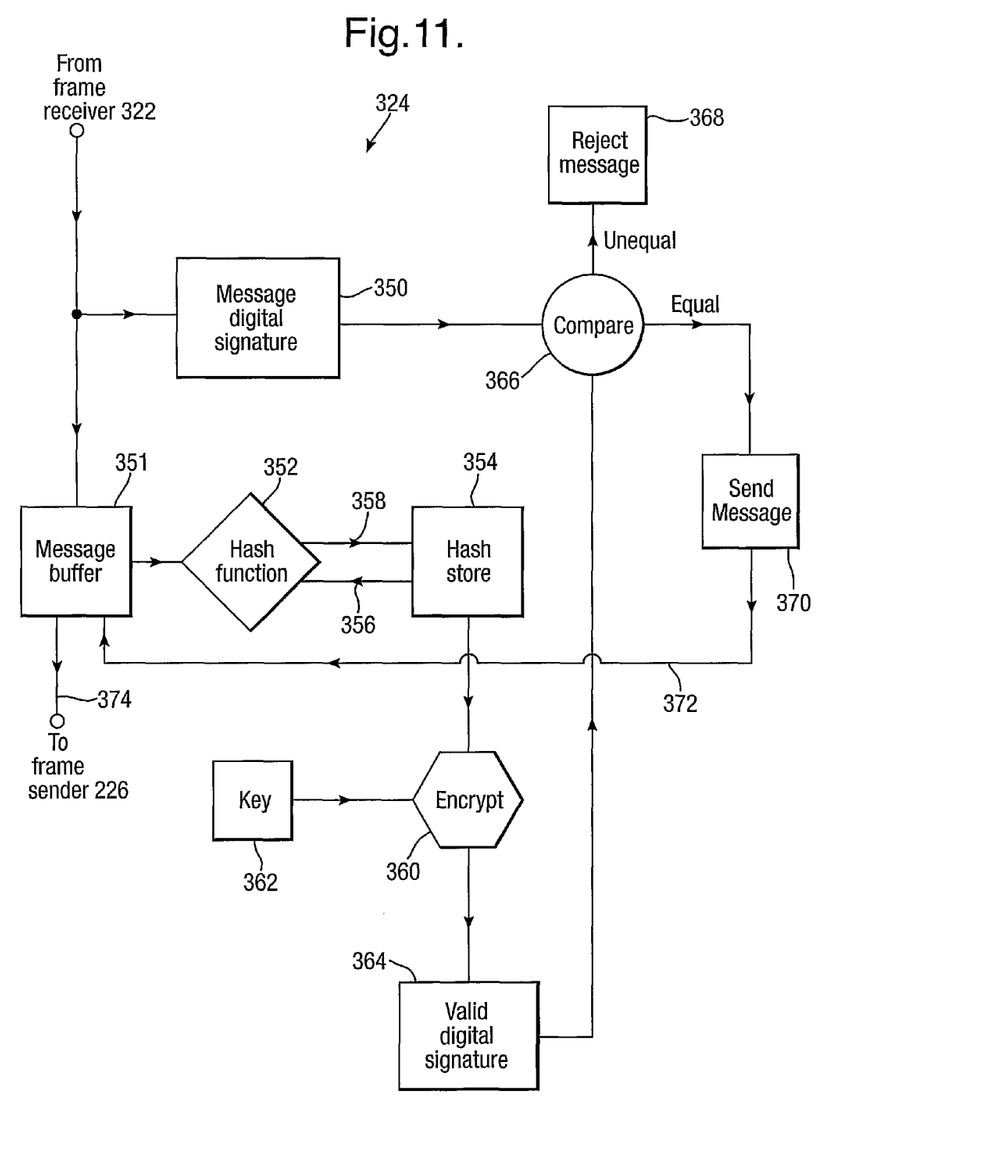
FIG. 11 is a block diagram showing in more detail a signature verifier incorporated in the FIG. 10 firewall.

The signature verifier 324 is shown in more detail in FIG. 11. In this example as has been said the first frame from the frame receiver 322 is the message digital signature, and it is removed from the message frame sequence and placed in a message digital signature store 350. All frames in the message other than the first frame pass in succession one frame at a time into a first in first out (FIFO) message buffer store 351 in which they are stored in serial number sequence. That part of the message buffer store 351 containing the most recently received frame is read by a hash function processor 352, which processes this frame by applying to it a hash function obtained from a hash function store 354 as indicated by an arrow 356. This is repeated for successive frames until the whole message has been processed. The hash function processor 352 operates incrementally, each processed frame making a contribution which is combined with contributions from all preceding frames so that a hash number for a whole message is accumulated. It is not essential for the hash function processor 352 to operate incrementally or a frame at a time: it can operate with a section of data or message subdivision of any length, but processing is faster if it operates incrementally because it can be done in parallel with data arriving instead of lying idle while a complete message is read.

Hash function processing is well known and will not be described in detail: it converts data in the message into a hash number unique to that data, and the value of the hash number is very sensitive to changes in the data, even very minor changes such as exchange of two binary digits. Since the hash number is obtained from all the data in a message, the signature verifier 324 is operating at the software application level. The accumulated hash number is passed to the hash function store 354 as indicated by an arrow 358.

The hash number is read from the hash function store 354 by encryption software 360, which encrypts it with an encryption key in a key store 362. The result of this encryption is a digital signature which is valid for the data received at 352, and it is entered into a valid digital signature store 364. The encryption may be symmetric or asymmetric, both approaches being known in the art of data encryption. In symmetric encryption the same encryption key is used by both the source network and the firewall 302. In asymmetric encryption a secret key is used by the source network to generate a signature and a verification key is used by the signature verifier 324 to check the signature. Details of the secret key are not disclosed publicly, but the verification key can be disclosed. The secret key and the verification key are sometimes referred to as a private key and a public key respectively.

The message digital signature stored at 350 and the valid digital signature stored at 364 are read by a comparator 366 which compares them. If these signatures are unequal, it means that the message digital signature or the data in the message has become adulterated in some way after the digital signature was applied to the message by the source network's checker (see e.g. checker functionality 250 in FIG. 9), and the message is rejected at 368.

If the signatures are equal, the data in the message remains unadulterated since leaving the source network's checker, and the comparator 366 triggers output of a data write instruction stored in a send message store 370: this instruction passes via a connection 372 to the message buffer store 351, which writes the message at 374 to the frame sender 326 in FIG. 10 for onward transmission to the destination network. Since the message digital signature was removed before the rest of the message was read into the message buffer store 351, it is not received by the destination network and cannot be used reverse engineer the checking process and defeat the firewall system 300.

Two firewalls 300 of the invention may be used in series to provide defence against a spontaneous failure of one firewall that might allow unsigned data to be transmitted to a destination network. Two such firewalls 300 may be used in parallel and arranged for data flow in mutually opposite directions to provide for two-way communication.

The invention claimed is:

1. A firewall system comprising:
signature validation hardware for receiving data for validation and for indicating whether or not the data incorporates a valid signature; and the signature validation hardware provides a means for operating at software application level to ascertain data signature validity;
an inner host computer for receiving data for validation by the signature validation hardware; and
an outer host computer for transmitting validated data;
the inner and outer host computers each implementing:
 a) complex communication protocols for communications to remote computer networks, and
 b) lower level communications protocols for communications to the signature validation hardware
and the system being arranged such that all data for validation received by the inner host computer by means of the complex communication protocols is forwarded, via the validation hardware by means of communication links employing the lower level communication protocols, to the outer host for onward transmission by means of the complex communication protocols.

2. A firewall system according to claim 1 wherein the signature validation hardware has digital circuitry to implement protocol handling and to ascertain signature validity.

3. A firewall system according to claim 1 wherein the signature validation hardware incorporates means for applying a hash function to data to create a hash number and means for encrypting the hash number to generate a signature unique to such data for comparison with and in order to ascertain validity of the signature incorporated in the data.

4. A firewall system according to claim 3 wherein the means for applying a hash function to data incorporates a store in which data are stored sequentially for access in applying the hash function.

5. A firewall system according to claim 4 wherein the store is for outputting data in response to validation of the signature incorporated in the data.

6. A firewall system according to claim 3 wherein the means for applying a hash function to data accumulates a hash number by processing data sequentially in sections.

7. A firewall system according to claim 1 wherein at least one of the remote computer networks is responsible for applying complex checks to such data and applying a digital signature thereto.

8. A firewall system according to claim 1 for communicating via connection media.

9. A firewall system according to claim 1 wherein the signature validation hardware incorporates field programmable gate array circuitry.

10. A firewall system according to claim 1 wherein the signature validation hardware incorporates logic units controlled by firmware.

11. A firewall system according to claim 1 wherein the firmware is Harvard Architecture microcontroller firmware.

12. A firewall system according to claim 1 for data transfer in series with a second like firewall system providing protection against system failure.

13. A firewall system according to claim 1 for data transfer in parallel with and in the opposite direction to a second like firewall system providing for two-way communication.

14. A method of providing firewall protection comprising the steps of:—
   a) receiving, at an inner host computer, data for validation from a source computer system using complex communication protocols;
   b) converting the data to a form based on relatively lower level communication protocols;
   c) communicating the converted data, via a first communication link employing said lower level communication protocols, to signature validation hardware for indicating whether or not such data incorporates a valid signature, the signature validation hardware operating at software application level to ascertain data signature validity; and
   d) communicating data associated with a valid signature via a second communication link employing said lower level communication protocols, to an outer host computer system for onward transmission using complex communication protocols.

15. A method according to claim 14 wherein the signature validation hardware has digital circuitry to implement protocol handling and to ascertain signature validity.

16. A method according to claim 14 including the steps of:—
   a) using the signature validation hardware to apply a hash function to data to create a hash number; and
   b) encrypting the hash number to generate a signature unique to such data for comparison with and in order to ascertain validity of the signature incorporated in the data.

17. A method according to claim 16 wherein the step of applying a hash function incorporates storing data in a store sequentially for access in applying the hash function.

18. A method according to claim 16 wherein the step of using the signature validation hardware to apply a hash function to data includes accumulating a hash number by processing data sequentially in sections.

19. A computer software product comprising a computer readable non-transitory medium containing computer readable instructions for controlling operation of computer apparatus to provide firewall protection, wherein the computer readable instructions provide a means for controlling the computer apparatus to:
   a) receive data for validation, at an inner host computer, from a source computer system using complex communication protocols;
   b) convert the data to a form based on relatively lower level communication protocols;
   c) communicate the converted data, via a first communication link employing said lower level communication protocols, to signature validation hardware for indicating whether or not such data incorporates a valid signature, the signature validation hardware operating at software application level to ascertain data signature validity; and
   d) communicate data associated with a valid signature, via a second communication link employing said lower level communication protocols, to an outer host computer system for onward transmission using complex communication protocols.

20. A computer software product according to claim 19 wherein the computer readable instructions also provide a means for controlling the computer apparatus to communicate with the signature validation hardware and the source and destination computer systems media links.

21. A computer software product according to claim 19 wherein the signature validation hardware has digital circuitry to implement protocol handling and to ascertain signature validity.

22. A computer software product according to claim 19 wherein the computer readable instructions also provide a means for controlling the computer apparatus to:—
   a) use the signature validation hardware to apply a hash function to data to create a hash number; and
   b) encrypt the hash number to generate a signature unique to such data for comparison with and in order to ascertain validity of the signature incorporated in the data.

23. A computer software product according to claim 22 wherein the computer readable instructions also provide a means for controlling the computer apparatus to use the signature validation hardware to apply a hash function by a procedure which incorporates storing data in a store sequentially for access in applying the hash function.

24. A computer software product according to claim 22 wherein the computer readable instructions also provide a means for controlling the computer apparatus to apply a hash function to data by a procedure which includes accumulating a hash number by processing data sequentially in sections.

* * * * *